Jan. 17, 1950  F. A. BLOOM  2,494,792
SKULL CLAMP

Filed March 3, 1947  2 Sheets-Sheet 1

Inventor
Frederick A. Bloom
By E. V. Hardway
Attorney

Jan. 17, 1950     F. A. BLOOM     2,494,792
SKULL CLAMP

Filed March 3, 1947     2 Sheets-Sheet 2

Inventor
Frederick A. Bloom
By E. V. Hardway
Attorney

Patented Jan. 17, 1950

2,494,792

UNITED STATES PATENT OFFICE 2,494,792

SKULL CLAMP

Frederick A. Bloom, Houston, Tex.

Application March 3, 1947, Serial No. 732,094

2 Claims. (Cl. 128—92)

This invention relates to a skull clamp.

An object of the invention is to provide a surgeon's appliance designed for use in the treatment of fractures and dislocation of the facial bones and the bone structures of the skull or neck and embodies improved means for anchoring the clamp to the skull bone.

Another object of the invention is to provide a clamp of the character described embodying skull pins having pointed inner ends and which are adjustable so that the clamp may be readily applied to skulls of various shapes and firmly secured thereto.

More specifically an object of the invention is to provide a surgical appliance of the character described embodying a clamp which may be easily manipulated to any one of a plurality of positions depending upon the nature and location of the fracture together with supporting traction, retention or compression wires or other implements customarily used in the treatment of fractures, dislocations or malformations of the bone structure of the face, head, neck or structure contiguous thereto.

Other objects and advantages will be apparent from the following specification which is illustrated by the accompanying drawings wherein.

Figure 1:
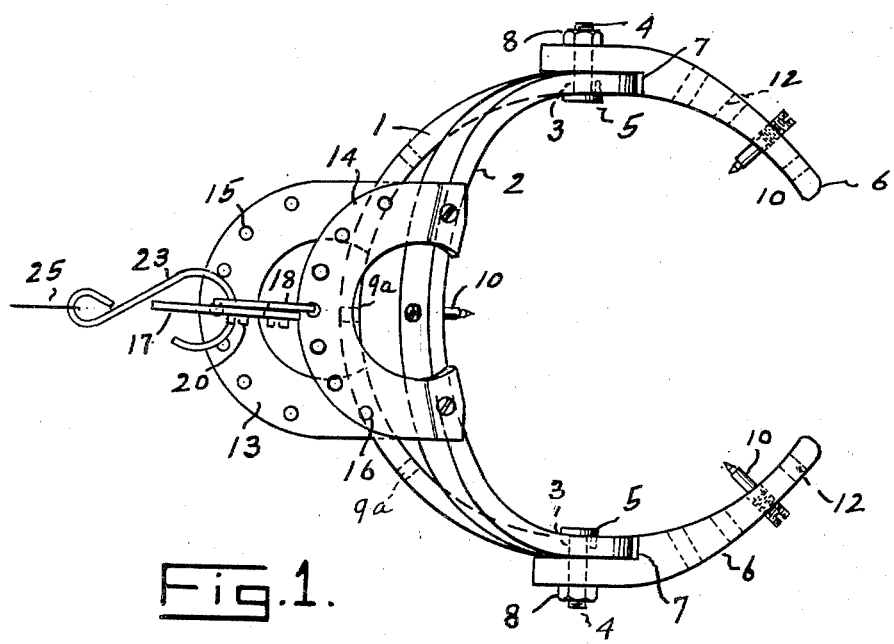
Figure 1 is a plan view of the appliance as used for applying traction, or tension, to the neck structure of the patient.

Referring now more particularly to the drawings, wherein like numerals of reference designate the same parts in each of the figures, the numerals 1 and 2 designate the arcuate diverging arms, or wings, of the main clamp member which are internally joined together and at their juncture are formed with transversely aligned bearings 3, 3.

Clamp bolts 4, 4 extend through these bearings said bolts having enlarged heads 5, 5 on their inner ends.

The numerals 6, 6 designate similar, arcuate clamping arms which, at one end, have the inside countersunk portions 7, 7 to receive the joined ends of the wings 1, 2 and the clamp bolts 4 extend through the adjacent ends of the clamp arms 6. The outer ends of the clamp bolts 5 are threaded to receive the clamp nuts 8, 8 which are screwed thereon. By loosening the nuts 8 the clamp arms 6 may be adjusted to any desired position relative to the main clamp. The other ends of the clamping arms 6 are free.

The wing 1 of the main clamp is provided with an internally threaded bore 9 and threaded through this bore there is a skull pin 10. The wing 2 is also provided with spaced bores 9a and skull pins 10 may be threaded through selected bores 9a.

Figure 3:
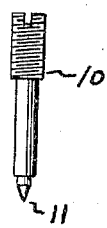
Figure 3 is a side elevation of a skull pin employed.

As will be noted from an inspection of Figure 3 the outer end of this skull pin is enlarged and threaded so as to be screwed into the bore 9 and its inner end is reduced and terminates in a point 11.

Each of the clamping arms is provided with a row of internally threaded bores, as 12, which are spaced apart longitudinally along the clamping arms. Skull pins 10 may be screwed into any of these bores 12 as desired.

When the appliance is applied to the skull of the patient the clamping arms 6, 6 may be adjusted to the desired angle and the skull pins 10 then screwed inwardly until their points firmly engage the skull bone of the patient so as to firmly anchor the appliance in place. This may be done without substantial discomfort to the patient, and without the points 11 penetrating the outer table of the skull.

Figure 2:
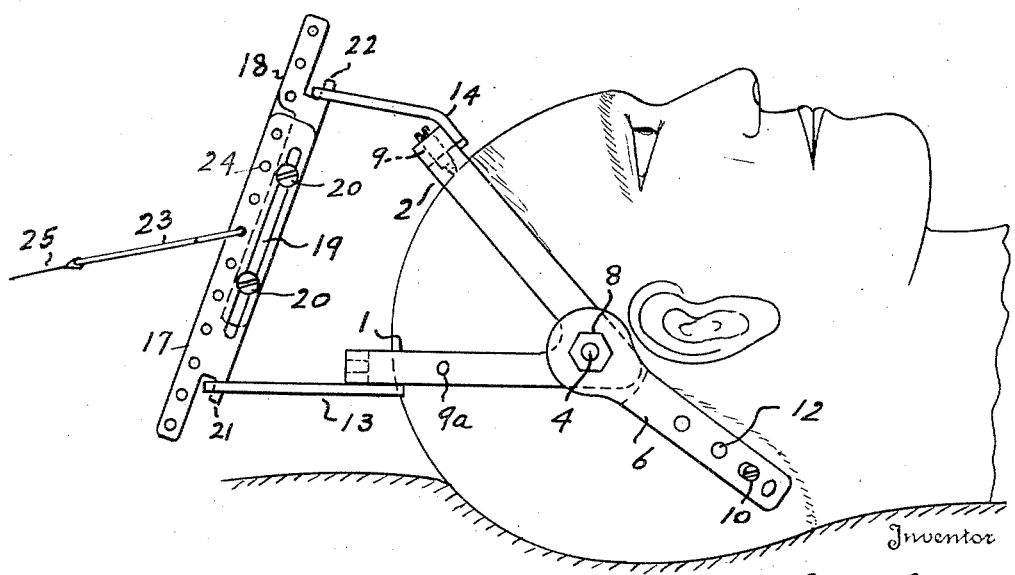
Figure 2 is a side view thereof.

As illustrated in Figures 1 and 2 the appliance is secured to the head of the patient in a position to apply traction to the neck of the patient while lying in horizontal position.

While so used arcuate lower and upper yokes 13 and 14 have their free ends detachably secured to the corresponding lower and upper wings 1, 2 of the main clamp. These yokes have an arcuate row of perforations 15, 16 therethrough. Connected to the yokes there is a traction bar formed of two substantially similar sections 17, 18. This section 17 has a longitudinal slot 19 therein and clamp screws 20 extend through said slot and are screwed into the section 18 so that the sections of the bar may be adjusted relative to each other and fixed at any selected point of adjustment. The sections 17, 18 have projections 21 and 22 on their inner sides which may be inserted through selected openings 15, 16 in the corresponding yokes 13, 14. In doing this the screws 20 should be loosened and the traction bar applied as stated and the clamp screws 20 then again tightened.

A hook, as 23, may then be engaged through aligned holes, as 24, in the traction bar said hook serving as an anchorage for the traction wire, or cord, 25.

The required traction, or tension, may be thereby applied to the neck of the patient and maintained the required length of time to permit healing.

Figure 4:
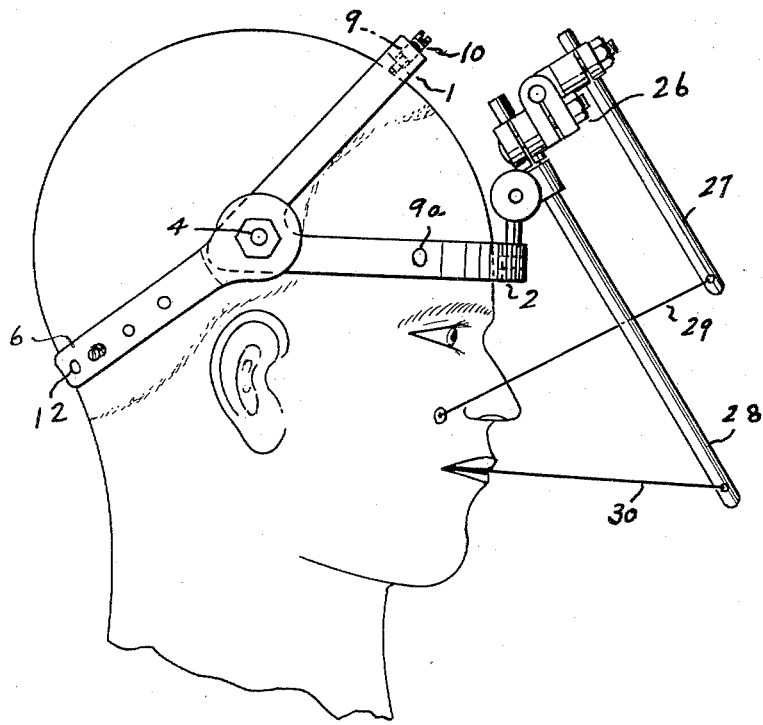
Figure 4 is a side view of the appliance in position for adjusting and maintaining facial or maxilla bones in place for healing.

When the appliance is fitted to the head of the patient for use in applying tension to the neck structure the main clamp is fitted over the crown portion of the head with the clamping arms around the sides of the head behind the ears; but when used for moving the facial, or maxilla, bones into position for healing the appliance is adjusted forwardly, as illustrated in Figure 4, with the wing 1 around the frontal portion of the skull and the wing 2 in approximately horizontal position about the forehead and with the clamping arms 6 about opposite sides of the head in the rear.

While in this position conventional tensioning equipment, such as 26, may be mounted on the forward portion of the wing 2. This equipment includes the upper and lower tensioning arms 27 and 28.

The tensioning wires, or cords, 29, 30 may be attached, in any approved manner, to the broken bones to be moved into position and with their outer ends attached to the tensioning arms 27, 28 and the required tension thus taken and maintained until the bones have reunited.

This tensioning equipment 26 is in common use and it is not deemed necessary to further describe its construction in detail.

The drawings and description are illustrative merely while the broad principle of the invention will be defined by the appended claims.

What I claim is:

1. An appliance of the character described comprising, a main clamp shaped to partially surround the skull of a patient, clamping arms adjustably connected to the ends of the main clamp and skull pins adjustably mounted on the main clamp and clamping arms whose inner ends are pointed to penetrate to, and to engage, the skull bone of a patient.

2. An appliance of the character described comprising, a main arcuate clamp formed of rigid material and shaped to surround the skull of a patient, arcuate clamping arms formed of rigid material and pivotally connected to the ends of the main clamp, skull pins threaded through the main clamp and clamping arms whose inner ends are pointed to penetrate to, and to engage the skull bone of the patient.

FREDERICK A. BLOOM.

REFERENCES CITED

The following references are of record in the file of this patent:

UNITED STATES PATENTS

| Number | Name | Date |
|---|---|---|
| 841,714 | Peters | Jan. 22, 1907 |

OTHER REFERENCES

Thoma, Kurt H., et al., "Massachusetts General Hospital Clinic," American Journal of Orthodontics and Oral Surgery, April 1944, page 205.